United States Patent [19]

Keeler

[11] 3,864,582

[45] Feb. 4, 1975

[54] MOSFET DYNAMIC CIRCUIT

[75] Inventor: Eugene R. Keeler, Suffern, N.Y.

[73] Assignee: Timex Corporation, Waterbury, Conn.

[22] Filed: Jan. 22, 1973

[21] Appl. No.: 325,302

[52] U.S. Cl.............. 307/225 C, 307/205, 307/208, 307/223 C, 307/279

[51] Int. Cl........................ H03k 21/00, H03k 23/02

[58] Field of Search........ 307/205, 208, 214, 221 C, 307/223 C, 225 C, 279, 304

[56] References Cited

UNITED STATES PATENTS 3,524,077 8/1970 Kaufman........................ 307/208 X 3,716,723 2/1973 Heuner et al.................. 307/221 C

*Primary Examiner*—John Zazworsky

[57] ABSTRACT

An integrated complementary MOS transistor circuit is used to divide an input frequency by a factor or two, and similar circuits may be used as counters or shift registers. The circuit is dynamic, low in power consumption, and is based upon one or more inverters which operate in the pulsed power mode.

2 Claims, 10 Drawing Figures

MOSFET DYNAMIC CIRCUIT

BACKGROUND OF THE INVENTION

One of the basic types of circuits is a "divide-by-two" count-down circuit in which an input frequency is divided by a factor of two. Such circuits may be connected in series to form a multi-stage binary counter.

It has been suggested that the count-down divide-by-two circuit should be statically bistable. Such a bistable circuit is triggered into one state by a first pulse and holds that one state until triggered into its other state by the subsequent pulse. the pulses may be, for example, from the frequency source, such as the crystal oscillator, or from a preceding count-down circuit. Such circuits, which are able to hold either of their states indefinitely until triggered, require a relatively large number of transistors, for example, 16 transistors in one stage, and consequently may be relatively complex to manufacture and relatively high in power consumption.

It has also been suggested that the count-down circuit be dynamic, that is, a count-down circuit which will not hold its state indefinitely. If the input frequency is sufficiently high, for example, above 1 KHz (1,000 cycles per second) then the subsequent trigger pulse arrives before the circuit has, on its own, changed state. Such dynamic count-down circuits may require fewer transistors and have a lower power consumption then the statically stable types of circuits.

In order to save space, reduce cost, and provide a low power consumption, the circuits of the present invention are preferably "integrated," that is, the entire circuit is formed on a single chip (usually a flat wafer) of base material, such as silicon, although the circuit is not necessarily of the integrated type. The circuit is "complementary," that is, its transistors are of the P-channel and N-channel types. The transistors are of the "MOS" types, that is, they are formed using layers of "Metal" and "Oxide" and they are "Semiconductor."

In some applications, and particularly in wrist watches, the power consumption of the binary counter circuitry may be of critical importance. For example, in a quartz crystal watch the high frequency of a quartz crystal oscillator, which is the frequency standard, is counted down to produce time pulses which may be directly displayed, for example, in an electro-optical liquid crystal display, or which may synchronize a motor which drives a time display, or which directly drives a motor which operates a time display.

SUMMARY OF THE INVENTION

The present invention is a divide-by-two countdown circuit which is bistable and dynamic, i.e., it will not hold its state indefinitely. It is of the complementary MOS type.

A number of embodiments of the present invention will be described. However, each of those embodiments utilize an inverter, which is part of the circuit. The inverter is connected to a circuit, or generator, which changes the polarity of D.C. source voltage. In a watch the D.C. source is a small battery cell within the watch case. The transistors are Field Effect Transistors (FET) of the enhancement type.

It is a feature of the present invention to provide a dynamic integrated circuit consisting of at least two inverters, each of which inverters is a complementary pair of MOS transistors. Each of the transistors has a control gate electrode, a drain electrode and a source electrode. The circuit includes a first pair and a second pair of complementary transistors, wherein in each pair the source of one transistor and the source of the other transistor are connected to respective sources of reversing relative polarity, such reversals of polarity being the input frequency.

It is one of the features of the present invention to provide a count-down divide-by-two dynamic circuit consisting of a plurality of complementary pairs of MOS transistors which are portions of an integrated circuit. Each of the transistors has a control gate electrode, a source electrode and a drain electrode. The circuit includes a first pair of such transistors forming a first inverter whose gates are connected to respective sources of reversing relative polarity, such reversals of polarity being the input frequency. The circuit also includes a second pair of such complementary transistors, forming a second inverter, such second pair of transistors having their gate electrodes connected to between the common drain electrodes of the first pair. The circuit also includes a third pair of such complementary transistors whose gate electrodes are both connected to between the common drain electrodes of the second pair and a fourth pair of such complementary transistors, each of the gate electrodes of such fourth pair being connected to between the common drain electrodes of the third pair.

Other objectives of the present invention will be apparent from the detailed description set forth below, providing the best of mode of practicing the present invention, the description being taken in conjunction with the accompanying drawings.

Figure 3:
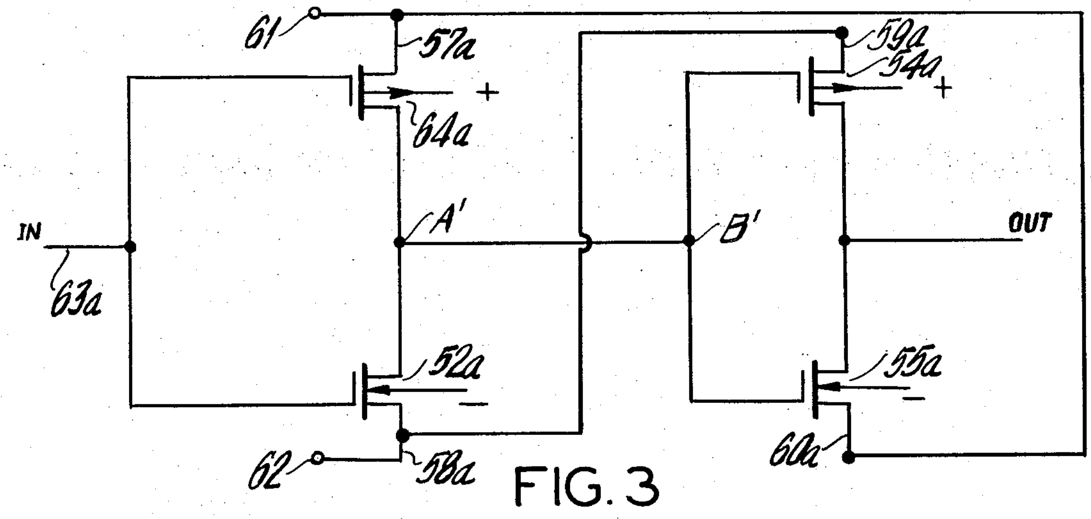
FIG. 3 is a schematic diagram of the third embodiment of the integrated circuit of the present invention, which operates as a shift register.
Figure 5:
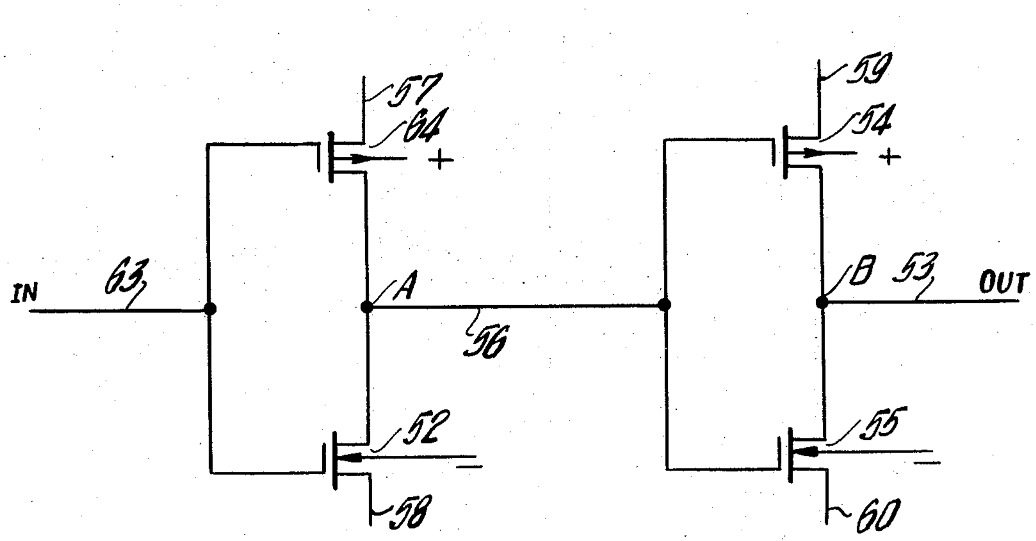
Figure 6:
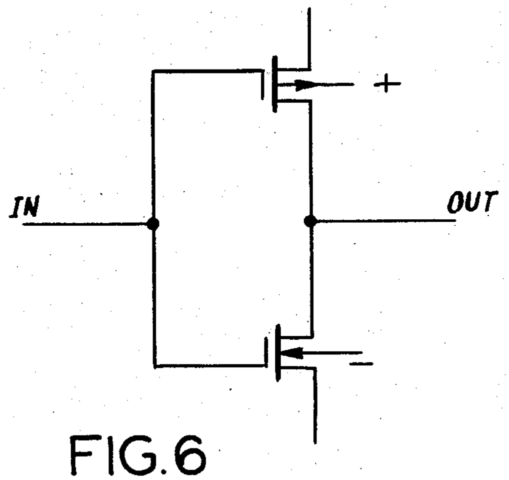
Figure 4A:
Figure 4B:
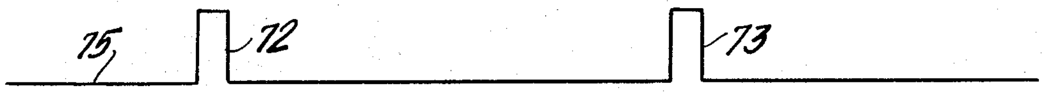

FIGS. 4*a* – 4*d* are a set of idealized square wave forms which are used in the circuits of the present invention, the wave forms of FIGS. 4*a* and 4*b* being 180° out of phase with each other;

FIG. 5 is similar to FIG. 3, except that the circuit of FIG. 5 is connected to two polarity reversal circuits and the wave forms of FIGS. 4*a*–4*d* apply;

FIG. 6 is a schematic diagram illustrating the basic inverter circuit; and

Figure 1:
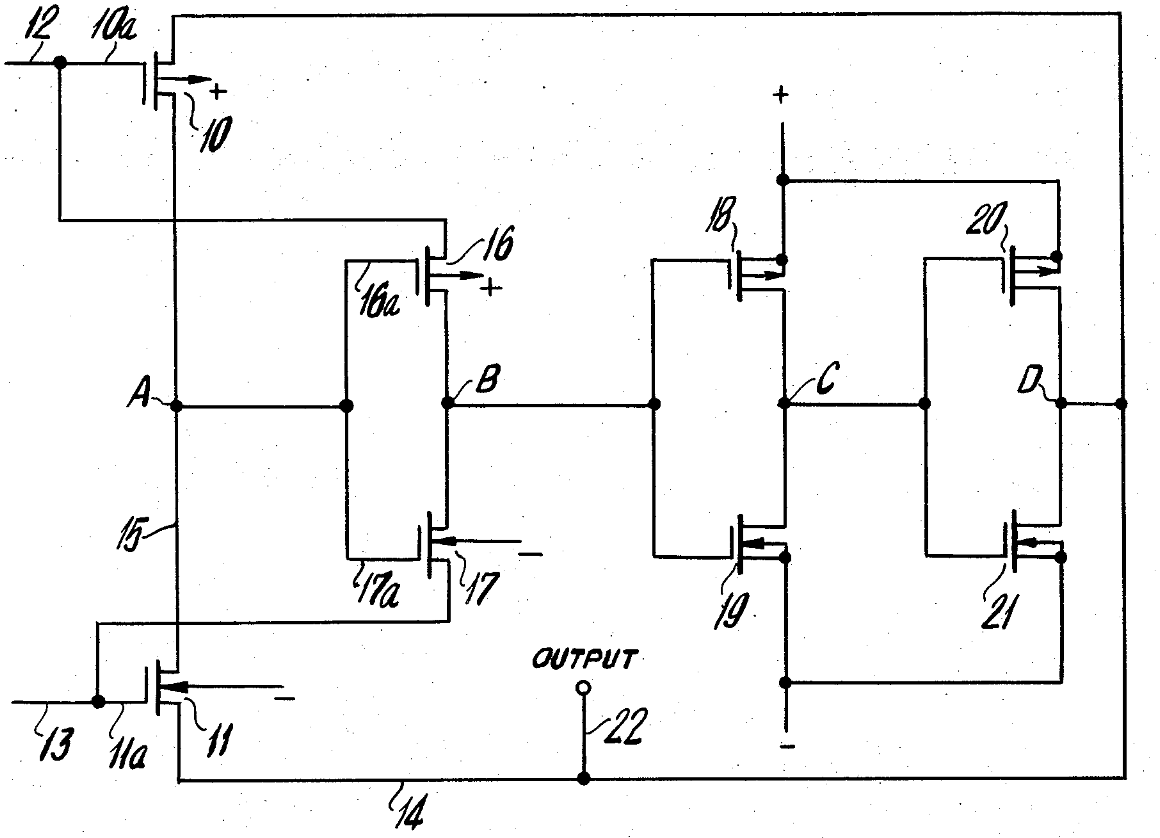
FIG. 1 is a schematic diagram of the arrangement of the first embodiment of the integrated circuit, the first embodiment functioning as a flip-flop.
Figure 7:
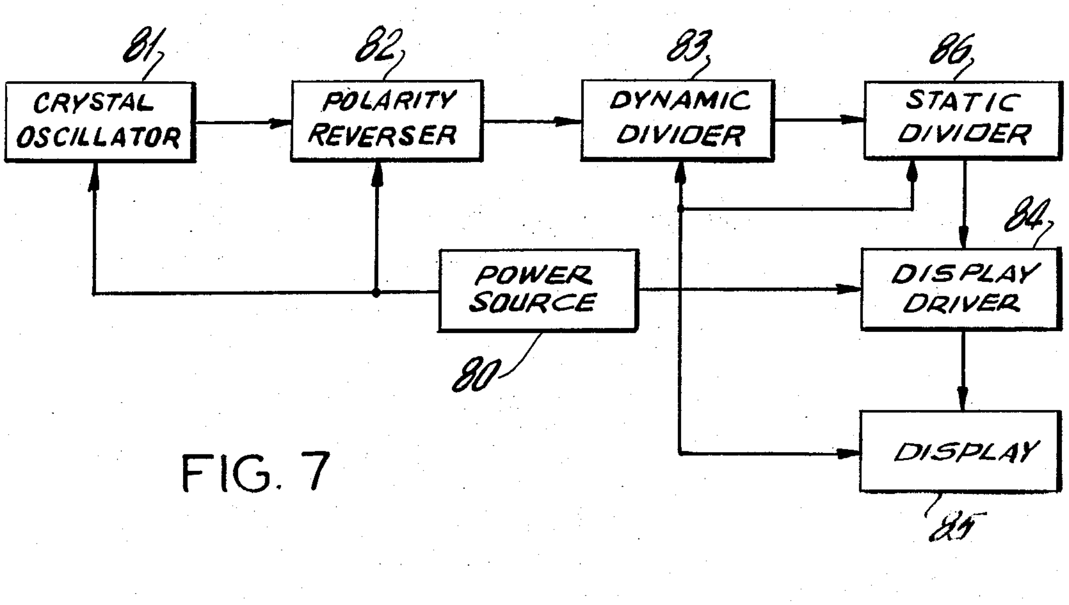

FIG. 7 is a schematic diagram of the circuit of FIG. 1 used in an electronic watch.

In the first embodiment of the present invention, shown in FIG. 1, the circuit is a divide-by-two countdown integrated circuit. In an integrated circuit all the components and interconnections are fabricated by processing appropriate areas of a single crystal semiconductive wafer (chip) such as a silicon wafer. The entire wafer is kept to a micro-miniature size. Generally, each of the wafers may consist of silicon which provides the substrate onto which various components are produced by diffusion. Alternatively, other methods of forming the integrated circuit may be used, such as ion implantation or layer deposition.

The transistors, as illustrated in connection with the present invention, are MOSFET's, that is, metal oxide semi-conductor field effect transistors. As illustrated in the accompanying drawings, the type of MOSFET's are either N-channel and P-channel enhancement mode. In the N-Channel enhancement transistors the arrow is pointing toward the channel (toward the device.) The enhancement type of MOSFET is non-conducting ("off" or "not enabled") until voltage of the correct polarity is applied to the gate electrode. In the case of an N-channel device, such as transistor 11 of FIG. 1, a positive voltage applied to the gate electrode (which varies the impedance of the device), over line 13, will change the channel region beneath the gate to thereby provide a conduction path between its N-type source and its N-type drain electrodes (called the high impedance electrodes). Conversely, in the P-channel transistor, such as transistor 10, a negative voltage on line 12 is required for conduction.

The circuit of FIG. 1 functions as a "flip-flop," that is, it has two states and is switched from one state to its other state by a reversal of polarity. It produces an output voltage level for each complete cycle, so that it produces one output pulse for two input pulses.

The circuit consists of eight MOS transistors in an integrated circuit. It is assumed that the absence of a pulse, i.e., ground voltage level, is a logic 0 and the presence of a positive pulse is a logic 1. The original polarity at the incoming lines 12 and 13 is respectively positive and negative and 180° out of phase.

The polarity on the lines 12 and 13 will be reversed and such reversals of polarity is the incoming frequency. When a reversal of polarity occurs, a negative (−) voltage pulse appears on line 12 and a positive (+) voltage on line 13, and, upon the next reversal, a positive voltage pulse appears on line 12 and a negative voltage pulse on line 13. The reversals of polarity are obtained from a polarity reversal circuit (not shown) which may use a flip-flop and other circuitry.

In operation, after the circuit has commenced operation, the "first period," as shown in the chart below, is with 0 at point D and polarity negative on line 13 and positive on line 12, the circuit is in one of its stable states. The polarity is then reversed, in the "second period," and negative voltage applied to line 12 and positive voltage to line 13. The 0 from point D is applied to point A through line 14, transistor 11 and line 15. The polarity is again reversed in the "third period," i.e., positive voltage is on line 12 and negative voltage on line 13, and the voltage at point A (its distributed parasitic capacitance) enables the gate 16*a* of transistor 16. Consequently, point B becomes 1, point C becomes 0 (because the gate of transistor 19 is enabled), and point D becomes 1 (because the gate of transistor 20 is enabled). In the "fourth period" the polarity is again reversed, with negative voltage on line 12 point A becomes 1 point B at 1, point C at 0, and point D at 1. Period 5 would be a repetition of Period 1 and so forth.

These relationships are illustrated in the following chart. The operation of the circuit is based upon retaining (trapping) the voltage at point A by the distributed parasitic capacitance at that point.

| Period | A | B | C | D | 11 | 17 | line 13 | output |
|---|---|---|---|---|---|---|---|---|
| 1 | 1 | 0 | 1 | 0 | off | on | − | 0 |
| 2 | 0 | 0 | 1 | 0 | on | off | + | 0 |
| 3 | 0 | 1 | 0 | 1 | off | off | − | 1 |
| 4 | 1 | 1 | 0 | 1 | off | off | + | 1 |

One will note that points B and D are at the same logic state, for example, both are at 0 at the same time. Consequently, B and D may be connected together and the transistors 18, 19, 20 and 21 eliminated. However, the remaining transistors 10, 11, 16 and 17 would have to be balanced, which may add additional time and cost to the manufacturing process. As shown in the chart above, the output 22 changes state once during the four periods and the line 13 (and line 12) has four difference polarities, which provides the divide-by-two result.

It can be recognized from the above, that transistor 10 is enabled to place point A at logic 1 when its source element (connected to point D) is at a logic 1 (positive) condition and its gate (connected to line 12) is at a logic 0 (negative) condition. Transistor 11 is enabled to place point A at logic 0 when its source element (also connected to point D) is at logic 0 and its gate (connected to line 13) is at a logic 1 condition. Thus, with the potentials, i.e., logic states, applied as above described either transistor 10 is enabled and point A is placed at logic 1 or transistor 11 is enabled and point A is placed at logic 0. Point B is placed at a logic 1 condition when transistor 16 is enabled, i.e., its source element (connected to line 12) is at logic 1 and its gate (connected to point A) is at logic 0. Point B is placed at a logic 0 condition when transistor 17 is enabled, i.e., its source element (connected to line 13) is at logic 0 and its gate (connected to point A) is at logic 1.

Figure 2:
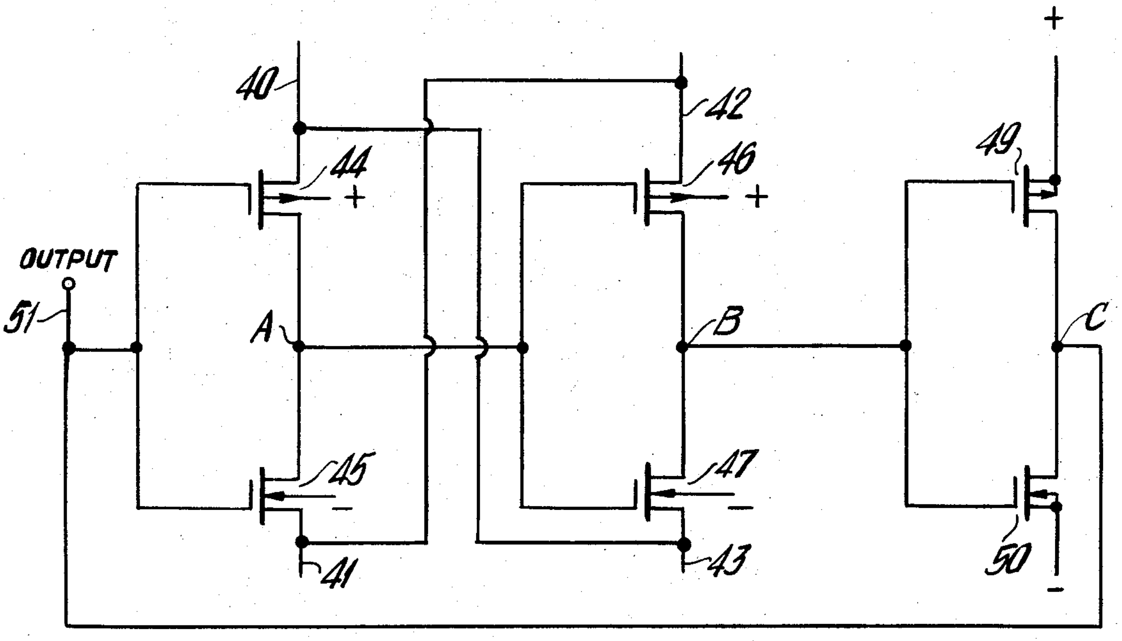
FIG. 2 is a schematic diagram of the integrated circuit of the second embodiment of the present invention, which operates as a binary divider.

A binary divider is shown in FIG. 2 as another embodiment of the present invention utilizing a bistable dynamic circuit. The circuit of FIG. 2 utilizes three complementary pairs of MOSFET transistors, each pair constituting an inverter. In this embodiment the pulsed power supplies having reversals of polarities are applied to the line 40, 41, 42 and 43, which are sources of the transistors 44, 45, 46 and 47. The polarities at line 41 and 42 are the same, and consequently those lines are connected together. Similarly, the polarities at lines 40 and 43 are the same, and consequently those lines may also be connected together. The polarity of the pulses applied to the first inverter, which consists of transistors 44 and 45, is opposite to the polarity of the second inverter, consisting of transistors 46 and 47. For example, a positive pulse may be applied to line 40 simultaneously with the negative pulse being applied to the line 42. The opposite polarity would be applied simultaneously to the lines 41 and 43, namely, negative to 41 and positive to 43.

The operation of the circuit of FIG. 2 is set forth in the chart below, which covers four periods and looks at the circuit during its operation. It will be noted that, during those four periods there are, for example, on line 40, two input pulses. At the output line 51 there occurs, however, only two changes of state. Consequently, for the four input states on the line 40 there are two output states at the output 51. The operation of FIG. 2 assumes a 0 at point C, which is between the transistors 49 and 50, when there is a negative voltage at line 40. The 0, by inversion, becomes a 1 at point A when line 40 becomes positive. When line 40 again becomes negative, the voltage at point A, stored by the parasitic capacitance, enables the gate of transistor 47, causing point B to a 0 state and point C to a 1 state. The next reversal of polarity causes A to a 0 state, which is stored at A when line 40 again goes to negative. Simultaneously the point B goes to a 1 state and point C goes to a 0 state.

| Period | A | B | C | line 40 | output |
|---|---|---|---|---|---|
| 1 | 0 | 1 | 0 | − | 0 |
| 2 | 1 | 1 | 0 | + | 0 |
| 3 | 1 | 0 | 1 | − | 1 |
| 4 | 0 | 0 | 1 | + | 1 |
| 5 | 0 | 1 | 0 | − | 0 |

Figure 4C:
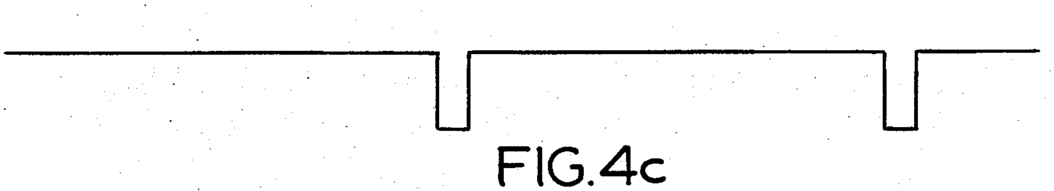
Figure 4D:
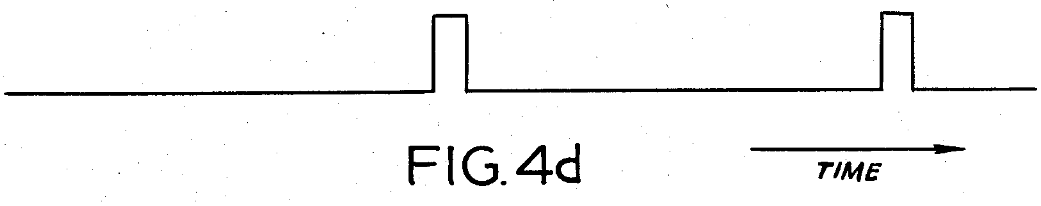

Still another embodiment of the present invention is illustrated in FIG. 5, which shows a single stage of a shift register. The circuit of FIG. 5 used two inverters, each consisting of a pair of complementary MOSFET transistors. The information input on line 63 is applied to the gate electrodes of the transistors 64 and 52, constituting the first pair. The output information is taken on line 53 which is connected between the common drains of the transistors 54 and 55, constituting the second pair. The common drains of transistors 64 and 52 are connected, by means of line 56, to the gate electrodes of transistors 54 and 55. As in the embodiment of FIG. 2, the polarity reversal power inputs are to the lines 57, 58, 59 and 60. For example, when a positive pulse is applied to the line 57, a negative pulse is applied simultaneously to the line 58, as is shown in FIGS. 4*a* and 4*b*. Pulses lagging in phase and reversed in polarity are applied to lines 59 and 60, as is shown in FIGS. 4*c* and 4*d*. A logic signal (information input), for example, an incoming pulse on line 63, will be transferred to the output line 53 after two reversals of the clock lines, i.e., the transfer requires two complete reversals of polarities.

In operation, a 0 at the input line 63 is inverted by the first inverter's circuit, consisting of transistors 64 and 52, to a 1 at point A when the first reversal of polarity occurs on the lines 57 and 58. When, after a phase lag, the lines 59 and 60 receive their reversal of polarity, the point B becomes 0.

FIGS. 4*a*–4*d* show idealized clock input pulse wave forms as constituting square waves. It will be realized, however, that such square waves are not necessary to effectuate the polarity reversals described in connection with the circuits of this invention, as other wave shapes may be used. In FIG. 4*a* the pulses 70,71 are illustrated as negative pulses which are 180° out-of-phase but simultaneous in relationship in time in regard to the positive pulses 72,73 of FIG. 4*b*. These pulses illustrate the relationship of polarities which are applied to the polarity reversal lines of the circuits of the present invention.

The pulses of FIGS. 4*a* and 4*b* and 4*c* and 4*d* are used in connection with the embodiment of FIG. 5. The pulses of FIG. 4*a* are applied to line 58; the pulses of FIG. 4*b* are applied to line 57; the pulses of FIG. 4*c*, which lag in phase relative to those of FIGS. 4*a* and 4*b*, are applied to line 60; and the pulses of FIG. 4*d* (simultaneous with those of FIGS. 4*c*) are applied to line 59.

The shift register of the embodiment of FIG. 3 operates in the same manner and has the same circuitry as the embodiment of FIG. 5, except for the connection of the clock (polarity reversal) lines. In FIG. 3 the lines 57*a* and 60*a* are connected and the lines 58*a* and 59*a* are also connected. The input clock pulses, having polarity reversals, are at 61 and 62.

As shown in FIG. 7, the horological movement of the present invention may be a watch. The power source 80 is a small battery cell within the watch case. The crystal controlled oscillator preferably has a frequency of 32,768 Hz. and is connected to the polarity reversing circuit 82. The dynamic divider 83 is a series of multi-stage divide-by-two circuits of the type of FIG. 1. It is connected to a conventional static multi-stage divide-by-two circuit 86. The display driver 84 may be an electromechanical converting motor to drive the hands of the display 85, or a circuit to convert the frequency into digital numerical form to show on an electro-optical display 85.

It will be understood that the terms "drain" and "source," as used herein, refer to the connections of the MOSFET devices and not to their structure, as generally their structure is symmetric and the drain and source connections may be interchanged.

It will be recognized that the invention, as described above, is of a preferred embodiment of the present invention and that the invention may be embodied in other specific forms without departing from its essential characteristics. The above-described embodiment, consequently, is to be considered as illustrative and not restrictive, the scope of the invention being set forth by the following claims and their equivalents.

What is claimed is:

1. A divide-by-two dynamic counter circuit consisting of at least three inverters, each of which is a complementary pair of MOSFET transistors, each of said transistors having a control gate electrode and a drain electrode, and a source electrode;

the circuit including a first pair of such transistors, each of which has its source electrodes connected to respective sources of reversing relative polarity so that each source receives reversals of polarity which are out-of-phase in respect to each other;

a second pair of such transistors, each of such second pair of transistors having its gate electrode connected to between common drain electrodes of said first pair and whose source electrodes are connected to said respective sources of reversing polarity and whose drain electrodes are connected together; and a third pair of such transistors whose gate electrodes are both connected to said common drain electrodes of said second pair;

the output being taken at the common drain electrodes of said third pair, and the gate electrodes of said first pair being connected to the common drain electrodes of said third pair.

2. A count-down divide-by-two dynamic integrated circuit consisting of a least four inverters each of which is a complementary pair of MOS transistors, each of said transistors having a control gate electrode, a source electrode and a drain electrode, the circuit including a first pair of such transistors, each of which has its gate electrodes connected to respective sources of out-of-phase reversing relative polarity, a second pair of complementary transistors, each of such second pairs of such transistors having its gate electrodes connected to a common connection of the drain electrodes of said first pair and its source electrodes connected to said respective polarity reversal sources;

a third pair of such transistors whose gate electrodes are both connected to the drain electrodes of said second pair;

and a fourth pair of such transistors, each of the gate elctrodes of such fourth pair being connected to the common drain electrodes of said third pair;

the output being taken at said drain electrodes of said fourth pair, and the drain electrodes of said fourth pair being connected to the source electrodes of said first pair.

* * * * *